United States Patent
Ogawa et al.

(12) 
(10) Patent No.: US 6,586,126 B1
(45) Date of Patent: Jul. 1, 2003

(54) TEMPERATURE CONTROLLER FOR FUEL GAS IN FUEL CELL SYSTEM

(75) Inventors: Takayuki Ogawa, Saitama (JP); Hideo Okamoto, Saitama (JP); Hidehiko Takase, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/562,675

(22) Filed: May 1, 2000

(30) Foreign Application Priority Data

Apr. 30, 1999 (JP) ............................................. 11-123349

(51) Int. Cl.[7] ................................................ H01M 8/04
(52) U.S. Cl. ............................................ 429/22; 429/24
(58) Field of Search ............................... 429/12, 13, 22, 429/24, 26

(56) References Cited

U.S. PATENT DOCUMENTS

| | | | | |
|---|---|---|---|---|
| 5,605,770 A | * | 2/1997 | Andreoli et al. ............... | 429/20 |
| 6,013,385 A | * | 1/2000 | DuBose ........................ | 429/17 |
| 6,186,254 B1 | * | 2/2001 | Mufford et al. .............. | 180/165 |
| 6,316,134 B1 | * | 11/2001 | Cownden et al. ............. | 429/12 |
| 6,331,366 B1 | * | 12/2001 | Van Dine et al. ............. | 429/17 |

* cited by examiner

*Primary Examiner*—Randy Gulakowski
*Assistant Examiner*—M. Wills
(74) *Attorney, Agent, or Firm*—Arent Fox Kintner Plotkin & Kahn (57) ABSTRACT

According to the present invention, access to a password area in a nonvolatile memory cannot be granted by simple supply of an address in a normal order. According to one preferable mode, for instance, a trap address is set in the password area so that reading information from the password area is permitted only when the password area is accessed without accessing the trap address, whereas when the password area is accessed the trap address, whereas when the password area is access through the trap address, information reading is inhibited, or meaningless data is output or the information in the password area is destroyed. This invention can make it harder to gain access to a password area which is used to protect against illegitimate copying and can provide a nonvolatile memory having a stronger copy protection capability.

4 Claims, 5 Drawing Sheets

FIG. 1

Fuel Cell System 1 (1st Embodiment)

Fuel Cell System 50 (Prior Art)

TEMPERATURE CONTROLLER FOR FUEL GAS IN FUEL CELL SYSTEM

FIELD OF THE INVENTION

The present invention relates to a temperature controller (control system) for a fuel gas in a fuel cell system which generates an electric power by supplying a modified hydrocarbon gas as a fuel gas to a fuel cell.

BACKGROUND OF THE INVENTION

A fuel cell system is an electric power system mainly composed of a fuel cell. The fuel cell generates an electric power by supplying hydrogen as a fuel gas to a hydrogen pole of the fuel cell and supplying an oxidizing gas containing oxygen gas such as air to an oxygen pole of the fuel cell. The fuel cell system directly converts a chemical energy to an electric energy and has a high power efficiency. In addition, the fuel cell system is assumed to be very clean power generating system which discharges negligible amount of environmental contaminating substances and, thus, has been under the examination of applicability to a wide variety of fields.

In such a fuel cell system, from the view points of difficulty to handle hydrogen and diversification of fuel sources, a gas except for hydrogen is utilized as a fuel gas. For example, a hydrocarbon fuel such as methane ($CH_4$) or methanol ($CH_3OH$) is reformed in a reformer to generate hydrogen, and the modified gas comprising hydrogen as a main ingredient is utilized in many cases. In the case of a vehicle like an automobile, on which fuel cell is carried, the use of hydrogen is inconvenient in the requirement of a long period of time for filling hydrogen and in the difficulty in carrying a large amount of hydrogen, resulting in a shortened mileage. For this reason, it has been considered that a liquid fuel like methanol is charged into an automobile, to be utilized as the fuel by modifying the liquid fuel in the reformer to generate a gas containing hydrogen as a main ingredient. Since methanol can be charged just like refueling and a mileage in this case is in no way to inferior to that in the case of the present automobile utilizing gasoline, making it possible to treating the automobile just like gasoline based car. What is more, in the case of utilizing methanol, since the methanol molecule only has one hydrogen atom, the amount of hydrogen generated is large and the proportion of carbon dioxide discharged is small in comparison with any other hydrocarbon fuel having a larger number of carbon atoms.

Figure 5:
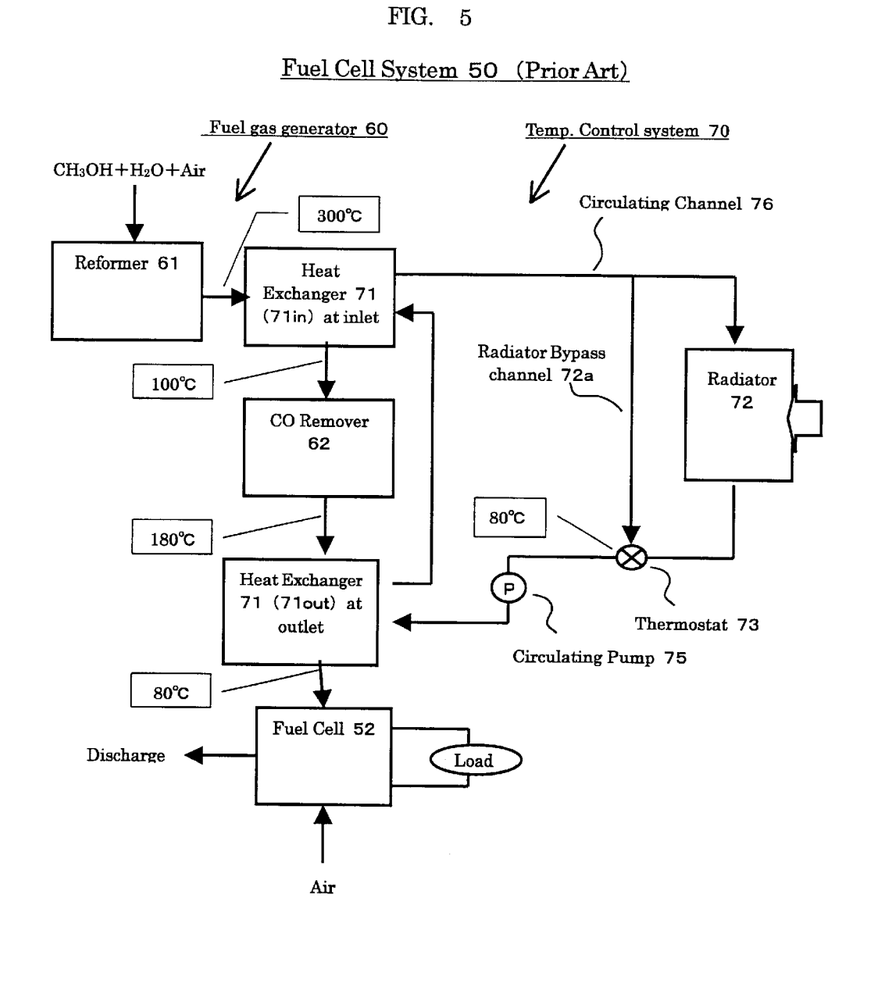
FIG. 5 is a block diagram of the conventional fuel cell system.

With reference to FIG. 5, the conventional fuel cell system 50 will be specifically described. The hydrocarbon fuel (methanol in this case) is introduced to a reformer 61 of a fuel gas generator 60 together with water and air at which the hydrocarbon fuel is modified to produce a fuel gas. While carbon monoxide (hereinafter sometimes referred to as "CO") is contained in the resulting fuel gas generated in the reformer only in a trace amount, CO, which poises the catalyst in a fuel cell 52, is converted into carbon dioxide by a CO remover 62 to be removed. The chemical reaction within the CO remover 62, of course, has an optimal temperature range. If the temperature is lower than this range, the proportion of converting (removing) CO becomes low, and conversely, if it is higher than this range, there is a possibility to bring about "converse shift" or "methanation" where the hydrogen generated unduly undergoes oxidation.

Since the fuel gas generated in the reformer 61 has a high temperature (e.g., 300° C.), the fuel gas is allowed to cool down to an appropriate temperature (e.g., 100° C.) by means of a heat exchanger $71_{in}$ at an inlet side, and then introduced into the carbon monoxide remover 62. The fuel gas from which CO has been removed by the CO remover 62 is introduced into the fuel cell 52. Since the chemical reaction within the carbon monoxide remover 62 is exothermic, the temperature of the fuel gas is increased (e.g., 180° C.). On the other hand, the working temperature of the solid macromolecule fuel cell is from normal temperature to approximately 150° C., a heat exchanger $71_{out}$ at an outlet side is placed between the CO remover 62 and the fuel cell 52 to cool the fuel gas (e.g., cooled to 80° C.). Subsequently, an electric powder is generated due to the reaction between the fuel gas supplied at the side of the hydrogen pole and air supplied at the side of the oxygen pole to supply electric power to a motor etc.

As described above, it is important to control the temperature of the fuel gas at the inlet and outlet of the carbon monoxide remover 61 in the fuel cell system 50, and the temperature is controlled by a temperature control system 70.

The temperature control system 70 has a circulating channel 76 for circulating a coolant medium (cooling water), having a radiator 72, a thermostat 73 for controlling the temperature of the coolant medium, a circulating pump 75 and the like in addition to the heat exchanger $71_{in}$ at an inlet side and the heat exchanger $71_{out}$ at an outlet side. In this temperature control system 70, the coolant medium circulating within the circulating channel 76 is controlled so as to keep its temperature at a constant level.

However, since the temperature control system 70 as described above has a configuration that the temperature of the coolant medium is controlled within a constant level by a thermostat 73, and the temperature of the fuel gas is controlled by the coolant medium having the constant temperature, the temperature of the fuel gas is decided basically by the ability of the heat exchanger 71, the temperature of the fuel gas at the inlet of the heat exchanger 71 and the flow amount. For this reason, the temperature of the fuel gas at the inlet of the CO remover 62 and that at the inlet of the fuel cell 52 cannot be controlled at a desirable level in a precision manner. Particularly, when the thermal load at the heat exchanger 71 is rapidly increased, as in the case where the temperature of the fuel gas is rapidly increased, the temperature control of the fuel gas utilizing the coolant medium having a constant temperature, has a restriction and, thus the temperature of the fuel gas at the outlet of the heat exchanger 71 is unduly increased. This problem cannot be solved if the flow amount of the coolant medium (cooling water) become variable.

Furthermore, in the case of carrying the fuel cell system on an automobile, since the fuel cell system is used in the state of a high variation in the thermal load of the fuel cell 52, it is required to keep the temperature of fuel gas at a constant level, quickly corresponding to the variation in the load according to driving operation.

SUMMARY OF THE INVENTION

An object of the present invention is, therefore, to provide a temperature control system for controlling a temperature of a fuel gas in a fuel cell system, which can quickly respond to the sharp variation in thermal load in an exchanger to control the temperature of the fuel gas to a desirable value in a precision manner.

We have studied to solve the problems associated with the prior art and to attain the object described above. As a result, we have found the fact that when a mechanism for controlling the temperature of the fuel gas is added to a thermostat for controlling the temperature by keeping the temperature of a coolant medium at a constant level, the temperature can be controlled at a desirable level in a precision manner due to the synergism between them, and completed the present invention.

The temperature control system for controlling a fuel gas of fuel cell of the present invention comprises a fuel reformer for reforming a hydrocarbon fuel into a reformed gas mainly comprising hydrogen, carbon monoxide remover or removing a carbon monoxide in the reforming gas and said reformed fuel gas is supplied to said fuel cell, said temperature control system comprising:

at least one heat exchanger which exchanges heat between the fuel gas and a coolant medium, said heat exchanger being placed at an inlet side and/or outlet side of said carbon monoxide remover, a radiator which radiates the heat exchanged by said heat exchanger, a thermostat which is connected to said radiator and a radiator bypass channel which bypasses said radiator, said thermostat being actuated by said coolant medium at a predetermined temperature, so as to decrease the flow of the coolant medium from the radiator when the temperature of the coolant medium is lower than said predetermined value, and increase the flow of the coolant medium from the radiator when the temperature of the coolant medium is higher than said predetermined value, a thermostat bypass control valve connected to said radiator and said heat exchanger, a control unit which detects the temperature of said fuel gas and/or said coolant medium, and controls said thermostat bypass control valve based on said detected temperature, so as to open said thermostat bypass control valve when said detected temperature is higher than a second predetermined temperature and, and to close said thermostat bypass control valve when said detected temperature is lower than said second predetermined temperature.

According to the temperature control system of the present invention, the thermostat bypass control valve is subjected to the coolant medium flowing within the thermostat to be bypassed to control the temperature of the fuel gas flowing toward the heat exchanger irrelevant to the temperature set by the thermostat. The temperature of the coolant medium flowing toward the heat exchanger is decided by the temperature of the coolant medium at the outlet of the thermostat, the temperature of the coolant medium at the outlet of the radiator, and the mixing ratio of both coolant media. The heat exchanger may be placed either in the inlet side or at the outlet side of the carbon monoxide remover, or at both sides of the carbon monoxide remover. If the heat exchanger is placed at the inlet side of the carbon monoxide remover, the temperature of the fuel gas at the inlet of the carbon monoxide remover is controlled. If the heat exchanger is placed at the outlet side of the carbon monoxide remover, the temperature of the fuel gas at the outlet of the carbon monoxide remover is controlled.

The "thermostat bypass valve" used herein is intended to include those which cannot control the opening of the valve (ON/OFF valve) as well as those which can control the opening of the valve in a voluntary manner. In the case of the thermostat bypass valve which can control the opening degree of the valve in a voluntary manner, the term "opening the thermostat bypass control valve" used herein includes the operation of valve in such a manner that the flow of the coolant medium is increased at a voluntary proportion. Also, in such a thermostat bypass valve, the term "closing the thermostat bypass valve" used herein includes the operation of valve in such a manner that the flow of the coolant medium is decreased at a voluntary proportion.

The term "detected temperature being within a prescribed level" used herein means that the detected temperature (preferably, the temperature of the fuel gas at the outlet of the heat exchanger) is within the temperature range tolerable for operating the CO remover or the fuel cell under the optimal temperature condition. The detected temperature may be the temperature of the fuel gas flowing towards the radiator or the temperature of the fuel gas flowing toward the heat exchanger or the temperature calculated from the combination of these temperatures by the control unit.

The temperature control system according to the present invention may be configured so that said temperature control system has the heat exchangers at the inlet and the outlet sides of the CO remover and, said circulating channel connects the heat exchangers in series to circulate the fuel gas from the heat exchanger placed at the outlet of the CO remover toward the heat exchanger placed at the inlet of the CO remover.

By such a configuration, the heat exchange between the coolant medium and the fuel gas is carried out in a counter flow.

The temperature control system according to the present invention may also be configured so that said temperature control system has the heat exchangers at the inlet and the outlet sides of the CO remover and, said circulating channel connects the heat exchangers in parallel.

According to this configuration, the temperatures of the fuel gas at the inlet and the outlet of the CO remover are controlled through own channels different from other channels of the heat exchangers. The differences in temperature Δt between the coolant medium and the fuel gas in all heat exchangers may be large.

In this configuration, the temperature control system may further be configured so that each heat exchanger has the thermostat, the thermostat bypass valve, and the circulating pump.

According to such a configuration, due to each heat exchanger having the thermostat, the thermostat bypass valve, and the circulating pump, the heat exchangers can control the temperature without any affect of the other heat exchanger.

DETAILED DESCRIPTION OF THE INVENTION

The present invention will now be described by referring to the following embodiments. However, the present invention is not restricted thereto.

First Embodiment

Figure 1:
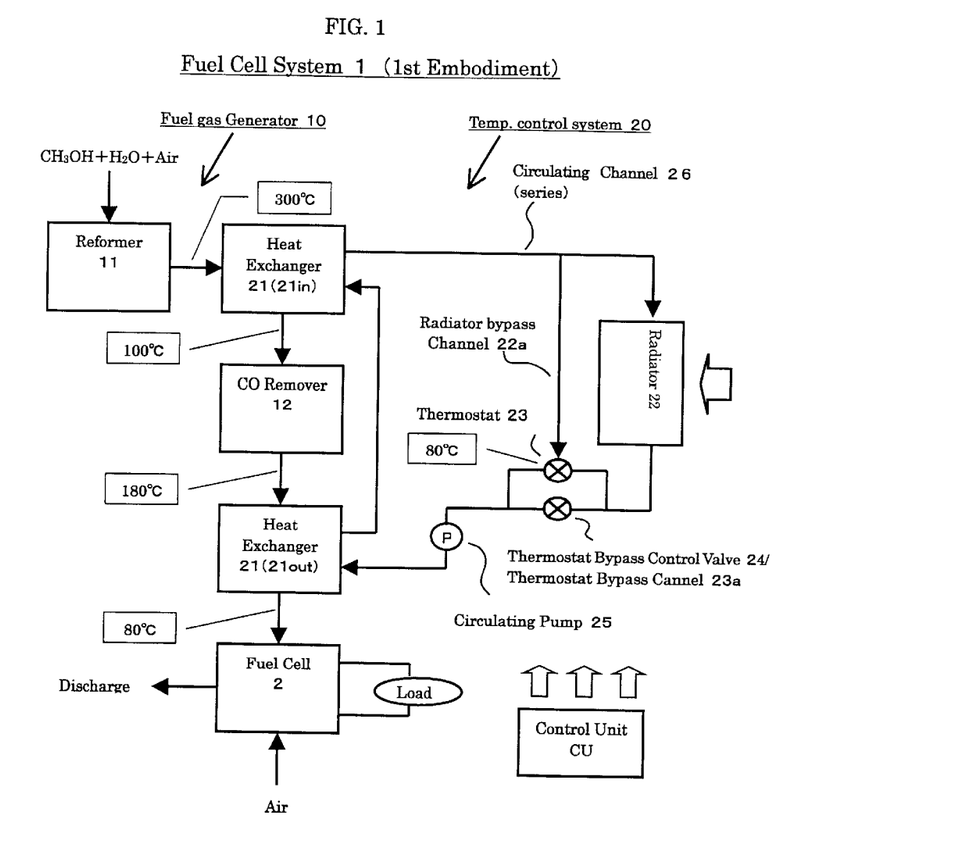
FIG. 1 is a block diagram of a fuel cell system according to the first embodiment of the present invention.

By referring to FIG. 1, a first embodiment of the present invention will be described. FIG. 1 is a block diagram of a fuel cell system according to the first embodiment of the present invention. The fuel cell system 1 shown in this figure is carried on a fuel cell electric vehicle (FCEV).

[Configuration]

The fuel cell system 1 according to the first embodiment is mainly composed of a fuel cell 2, a fuel gas generator 10, and a temperature control system 20. The fuel cell 2 of the fuel cell system 1 is a solid macromolecule type fuel cell to which a fuel gas and an oxidizing gas are supplied to electrochemically generate an electric power (see FIG. 1).

As the fuel gas for supplying a hydrogen pole of the fuel cell 2, a methanol-modified fuel gas is utilized in which methanol as a hydrocarbon fuel is modified in a generator 10 in order to be accorded with variation in the fuel source and in order to be operated just like gasoline carried vehicle. Air is used as the oxidizing gas to be supplied to the oxygen pole of the fuel cell.

The fuel gas generator 10 is mainly composed of a reformer 11 and a CO remover 12. The reformer 11 in this embodiment modifies methanol in the presence of a catalyst according to the following reactions to generate a fuel gas comprising hydrogen as a main ingredient.

Methanol and water are supplied into the reformer 11 and, thus, the fuel gas generated has a composition comprising hydrogen, carbon dioxide, nitrogen, and a trace amount of carbon monoxide. Methanol and water are converted into gaseous states in an evaporator (not shown), and then are supplied into the reformer 11.

The fuel cell 2 in this embodiment is a solid macromolecule type and, thus, it is not desirable to supply the gas containing CO into the fuel cell 2 as is, in terms of the fact that the platinum catalyst is poisoned. Consequently, the fuel gas from which CO is removed in the CO remover 12 is supplied into the fuel cell 2. Air is supplied into the CO remover 12 at which a selective oxidization of carbon monoxide is brought about in the presence of a catalyst to convert CO into $CO_2$, whereby CO is removed from the fuel gas. The oxidation in the CO remover 12 is exothermic and, thus, the fuel gas passing through the CO remover 12 is heated up (for example 100–180° C.).

The CO remover 12 and the fuel cell 2 have optimal operation temperatures. For example, if the temperature of the fuel gas within the CO remover 12 is unduly low, the conversion (removal rate) of CO is low, and conversely if it is too high, hydrogen undergoes oxidation to bring about "converse shift" or "methanation". Consequently, the fuel gas just generated in the reformer 11 which has a high temperature (e.g., 300° C.) is cooled to a prescribed temperature (e.g., 100° C.) before entering in the CO remover 12.

Since the operation temperature of the fuel cell 2 is from normal temperature to 150° C., the supply of the fuel gas having the temperature higher than the operation temperature is problematic in terms of heat resistance of a macromolecular electrolyte membrane and drying of the membrane. Consequently, the fuel gas exiting the CO remover 12 is cooled down to a prescribed temperature (e.g., 80° C.) before entering the fuel cell 2.

The cooling (temperature control) of the fuel gas is carried out by the temperature control system (see FIG. 1). The temperature control system 20 is mainly composed of a heat exchanger 21, a radiator 22, a thermostat 23, a thermostat bypass control valve 24, a circulating pump 25, and a circulating channel 26. The temperature control system 20 controls the temperature of the fuel gas due to the heat exchange between the coolant medium and the fuel gas by the circulation of the coolant medium.

The temperature control system 20 in this embodiment cools the temperature of the fuel gas.

In this embodiment, as the heat exchanger 21, heat exchangers $21_{in}$ and $21_{out}$ are placed at inlet and outlet side of the CO remover 12. As the heat exchanger 21, a shell and tube type heat exchanger may be utilized. Within the heat exchanger 21, the heat exchange between the fuel gas which is a high temperature fluid and the coolant medium which has a low temperature is carried out. Water or such is utilized as the coolant medium.

The heat exchanger $21_{in}$ cools the fuel gas flowing toward the CO remover 12 and the heat exchanger $21_{out}$ cools the fuel gas flowing toward the fuel cell 2. In the heat exchanger 21, for example when two CO removers are provided, i.e., the CO remover is divided into two removers, an intermediate heat exchanger may be placed between these two CO removers. This ensures the temperature control of the fuel gas in much more secure manner.

The radiator 22 is provided in order to discharge the heat received by the coolant medium out of the temperature control system 20, such as in atmosphere. As the radiator 22 to be used is one which can cool the temperature of the coolant medium to not more than the temperature set by the thermostat 23, which will be described later on.

The thermostat 23 actuates depending upon the temperature of the fuel gas passing therethrough. If the temperature of the fuel gas is lower than the temperature set by the thermostat 23, (e.g., when the flow amount of the fuel gas is decreased), the thermostat 23 decreases the flow amount of the coolant medium. Conversely, if the temperature of the fuel gas is higher than the temperature set by the thermostat 23, (e.g., when the flow amount of the fuel gas is increased), the thermostat 23 increases the flow amount the coolant medium. This makes the temperature of the coolant medium to maintain at the temperature set by the thermostat 23.

A thermostat bypass control valve 24 is fit to a thermostat bypass channel 23a which bypasses the thermostat 23. The thermostat bypass control valve 24 detects the temperature (s) of the fuel gas and/or the coolant medium, and actuates on the basis of the detected temperature(s) to open or close the thermostat bypass channel 23a. The thermostat bypass control valve 24 may be one which can freely control the opening of the valve. By freely controlling the opening of the valve, the temperature of the coolant medium can be carefully controlled.

The detected temperature may be, for example, the temperature obtained by detecting the temperature of the fuel gas at the outlet of the heat exchanger 21 (the terms "inlet" and "outlet" are based on the fuel gas). A control unit CU as shown in FIG. 1 controls the conditions of the thermostat bypass control valve 24.

The lower limit of the temperature of the fuel gas, which can be realized in the temperature control system 20 having the configuration shown in FIG. 1 is the temperature of the coolant medium which is cooled by passing through the radiator. On the other hand, the limit thereof is the temperature set by the thermostat 23. To be specific, the temperature of the coolant medium flowing toward the heat exchanger $21_{in}$ at the outlet side can be freely changed within the range from the temperature at the outlet of the radiator 22 to the temperature set by the thermostat 23.

The circulating pump 25 is a device for circulating the coolant medium within the coolant medium 20. The circulating channel 26 is a closed channel for circulating the coolant medium, having piping connected to the heat exchanger 21, the radiator 22 etc.

In some cases, in order to warm up the heat exchanger 21, the CO remover 12 etc. according to warming up the fuel cell system 1, a heating means for heating the fuel gas may be placed before the heat exchanger $21_{in}$ at the inlet side or a heating means for heating the coolant medium may be placed within the circulating channel 26. By placing a heating means downstream of the thermostat 23, the temperature of the heat-control medium can be set at a level higher than the temperature set by the thermostat 23.

[Actuation]

Subsequently, an embodiment of actuation of the temperature control system 20 in the fuel cell system 1 described above will be described. In this embodiment, the thermostat bypass control valve 24 used herein is one which can freely control the opening of the valve.

1) Variation with Small Thermal Load;

As for variation with small thermal load, due to the function of controlling the temperature possessed by the thermostat 23, the temperature of the fuel gas is controlled corresponding to the variation in thermal load in the heat exchanger 21. In this course, although the opening of the thermostat bypass control valve 24 is not regarded, a constant opening of the thermostat bypass control valve 24 is preferred in view of controlling the thermostat 23 only due to the thermostat bypass control valve 24 (Of course, the opening may be gradually changed.)

(1) Specifically, in such a case that the accelerator of the automobile is slightly pushed the flow amount of the fuel gas supplied to the fuel cell 2 is increased according to the degree of pushing the accelerator. At the same time, the amount of fuel gas passing through the heat exchanger 21 is increased. This makes the thermal load at the heat exchanger 21 increase. When the thermal load is increased, the heat transfer amount of the fuel gas to the coolant medium is increased, resulting in an increased thermal load at the heat exchanger 21. The increase in thermal load makes the heat transfer amount of the fuel gas to the coolant medium large, increasing the temperature of coolant medium.

When the temperature of the coolant medium becomes higher than the temperature set by the thermostat, the thermostat 23 increases the flow amount of the coolant medium whose temperature has been cooled down to be lower than the set temperature, and decreases the flow amount of the coolant medium bypassing the heat exchanger 21 through the bypass channel 23a having a temperature higher than the set temperature. This increases the flow amount of the coolant medium passing through the heat exchanger 22 to keep the coolant medium flowing forward the heat exchanger $21_{in}$ at a constant temperature.

Specifically, by the function of the thermostat 23 to keep the coolant medium at the set temperature, the flow amount of the coolant medium passing through the heat exchanger 21 is increased to accelerate the radiation in the radiator 22. As a result, the flow amount of the even when the thermal load is increased by increasing the flow amount of the fuel gas, the fuel gas at the outlet of the heat exchanger is kept at the prescribed temperature (e.g., 100° C., 800° C. shown in FIG. 1).

(2) Conversely, in such a case that the accelerator of the automobile which has been slightly pushed is returned to the original state to decrease the flow amount of the fuel gas resulting in decrease in the thermal load at the heat exchanger 21, the actuation reverse to the case of (1) is carried out. To be specific, in order to deal with the decrease in the thermal load, the amount of the coolant medium passing through the heat radiator 22 is decreased by the thermostat 23 to decrease the radiation. This keeps the temperature of the fuel gas at the outlet of the heat exchanger 21 at a prescribed value.

The temperature control system 20 in this embodiment is mainly designed to effectively absorb (radiate out) the increased thermal load when the thermal load is increased due to the increase in the flow amount of the fuel gas based on the condition of small flow amount of the fuel gas (e.g., at the idling state of the automobile i.e., the condition of small thermal load at the heat exchanger 21). From the same viewpoint, the opening of the thermostat bypass control valve 24 is preferably configured so as to block the bypass channel in the state where the thermal load at the heat exchanger 21 is the smallest.

2) Variation in Big Thermal Load:

As for the big thermal load, since the thermostat 23 cannot control the temperature in a quick manner, the temperature is controlled by the thermostat bypass control valve 24.

(1) Specifically, in such a case that the accelerator of the automobile is rapidly pushed, the flow amount of the fuel gas supplied to the fuel cell 2 is rapidly increased according to the degree of pushing the accelerator. In this course, the thermal load at the heat exchanger 21 is sharply increased, and the heat transfer amount of the fuel gas to the coolant medium is also quickly increased. However, since there is a limitation to control the temperature of the coolant medium having a prescribed temperature by the thermostat 23 and, thus, the temperature of the fuel gas at the outlet of the heat exchanger 21 is unduly increased.

In this embodiment, the temperature of the fuel gas at the heat exchanger 21 is detected, and based on the detected temperature, the opening of the thermostat bypass control valve 24 is increased when the detected temperature is higher than the prescribed temperature. At this time, the coolant medium whose temperature has been cooled down by the radiator 22 to be lower than the temperature set by the thermostat 23 bypasses the thermostat 23 and flows downstream of the thermostat 23. This can decrease the temperature of the coolant medium irrelevant to the temperature set by the thermostat 23, making it possible to introduce the coolant medium having a temperature lower than the set temperature to the heat exchanger 21 (i.e., making it possible to have a large difference $\Delta t$ in both temperatures).

What is more, since the opening of the thermostat bypass control valve 24 can be quickly controlled, the temperature of the coolant medium can be decreased with good responsibility to the variation in the thermal load.

Consequently, even when the thermal load at the heat exchanger 21 is increased, the temperature of the coolant medium can be quickly decreased to absorb the increase in the thermal load in a quick manner, keeping the fuel gas at a constant temperature.

(2) Conversely, in such a case that the accelerator of the automobile which has been rapidly pushed is returned rapidly (or gradually) to the original state to decrease the flow amount of the fuel gas resulting in decrease in the thermal load at the heat exchanger 21 (returning to the original state), the actuation reverse to the case of (1) is carried out. To be specific, by decreasing the opening of the thermostat bypass control valve 24 to decrease the flow amount of the coolant medium bypassing the thermostat 23, the temperature is controlled by the thermostat 23 utilizing the coolant medium having a constant temperature.

The thermostat bypass control valve 24 is controlled by the control unit CU by detecting the temperatures of the outlets of the heat exchangers $21_{in}$ and $21_{out}$, etc. and judging how to control by the control unit CU on the basis of the detected values.

As described above, by the addition of the temperature control due to the thermostat bypass control valve 24 to the temperature control of the fuel gas due to the thermostat 23, the use of the thermostat bypass control valve 24 makes it possible to quickly deal with the quick increase in the thermal load at the heat exchanger 21, which cannot be dealt (or followed up) by the thermostat 23 and, thus, the temperature of the fuel gas can be controlled in a precision manner in all cases.

For instance, in the automobile on which the fuel cell system is carried, the temperature control system in this embodiment is applicable to rapid variation in the thermal load due to acute acceleration or acute reduction, and slight variation in the thermal load at the heat exchanger such as slight acceleration or slight reduction from a running at a constant speed of high, middle or slow speed.

Second Embodiment

Figure 2:
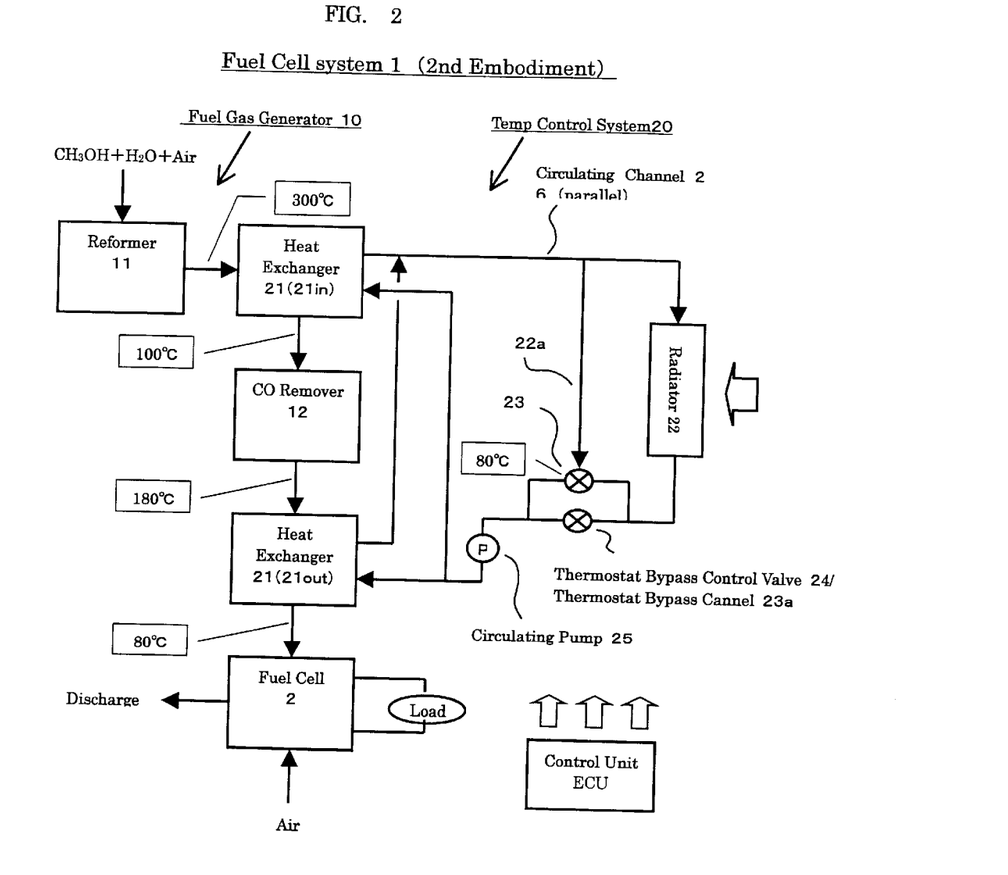
FIG. 2 is a block diagram of a fuel cell system according to the second embodiment of the present invention.

By referring to FIG. 2, a second embodiment of the present invention will be described. FIG. 2 is a block diagram of a fuel cell system according to the second embodiment of the present invention. The fuel cell system 1 shown in this figure is carried on a fuel cell electric vehicle (FCEV).

[Configuration]

The fuel cell system 1 according to the second embodiment has the same configuration as that of the first embodiment, unless otherwise mentioned. Consequently, the parts and the elements overlapped with the first embodiment have the same symbols and the repetition thereof will be omitted or described briefly.

As shown in FIG. 2, the fuel cell system 1 of the second embodiment is different from that of the first embodiment in that the circulating channel 26 connects the heat exchanger $21_{in}$ at the inlet side and the heat exchanger $21_{out}$ at the outlet side in parallel. Other parts such as the fuel cell 2 and the fuel gas generator 10 are the same as those of the first embodiment. To be specific, the coolant medium exiting the circulating pump passes through the separate channels and flows toward two directions, i.e., towards the heat exchanger $21_{in}$ at the inlet side and towards the heat exchanger $21_{out}$ at the outlet side, respectively, and they join after exiting the heat exchanger $21_{in}$ and the heat exchanger $21_{out}$, after which the joined flow goes towards the radiator 22 and a radiator bypass channel 22a. The second embodiment is different from the first embodiment in this point.

The proportion of the flow amount of the coolant medium flowing forward the heat exchanger $21_{in}$ at the inlet side to that flowing forward the heat exchanger $21_{out}$ at the outlet side may be previously decided depending upon the specification of the heat exchangers $21_{in}$ and $21_{out}$, etc.

[Actuation]

Subsequently, an embodiment of actuation of the temperature control system 20 in the fuel cell system 1 described above will be described. In this embodiment, the thermostat bypass control valve 24 used herein is one which can freely control the opening of the valve similar to the first embodiment.

1) Variation with Small Thermal Load:

As for variation with small thermal load, due to the function of controlling the temperature possessed by the thermostat 23 as in the first embodiment, the temperature of the fuel gas is controlled corresponding to the variation in thermal load in the heat exchanger 21. In the case where the thermal load is increased or vice versa, the thermostat 23 acts the same function as in the first embodiment.

2) Variation in Big Thermal Load:

As for the big thermal load, since the thermostat 23 cannot control the temperature in a quick manner as in the first embodiment, the temperature is controlled by the thermostat bypass control valve 24. In the case where the thermal load is increased or vice versa, the thermostat bypass control valve 24 acts the same function as in the first embodiment.

To be specific, when the thermal load is rapidly increased, the opening of the thermostat bypass control valve 24 is increased to bypass the thermostat 23 and to direct the coolant medium having a low temperature flowing from the radiator 22 towards downstream of the thermostat 23. This makes it possible to the temperature of the coolant medium flowing towards the heat exchangers ($21_{in}$ and $22_{out}$) lower than the set temperature. Accordingly, the temperature control system 20 of the second embodiment is applicable to a rapid increase in the thermal load at the heat exchanger 21, and can control the fuel gas at the outlet of the heat exchanger 21 in a precision manner.

As described above, by connecting the circulating channel 26 in parallel, the use of the thermostat bypass control valve 24 makes it possible to quickly deal with the quick increase in the thermal load at the heat exchanger 21, which cannot be dealt (or followed up) by the thermostat 23 and, thus, the temperature of the fuel gas can be controlled in a precision manner in all cases as in the first embodiment.

Particularly, by connecting the circulating channel 26 in parallel, the temperature difference Δt between the coolant medium and the fuel gas at the outlet side of the heat exchanger $21_{in}$ at the inlet side may be large, minimizing the heat exchanger $21_{in}$ at the inlet side.

Third Embodiment

Figure 3:
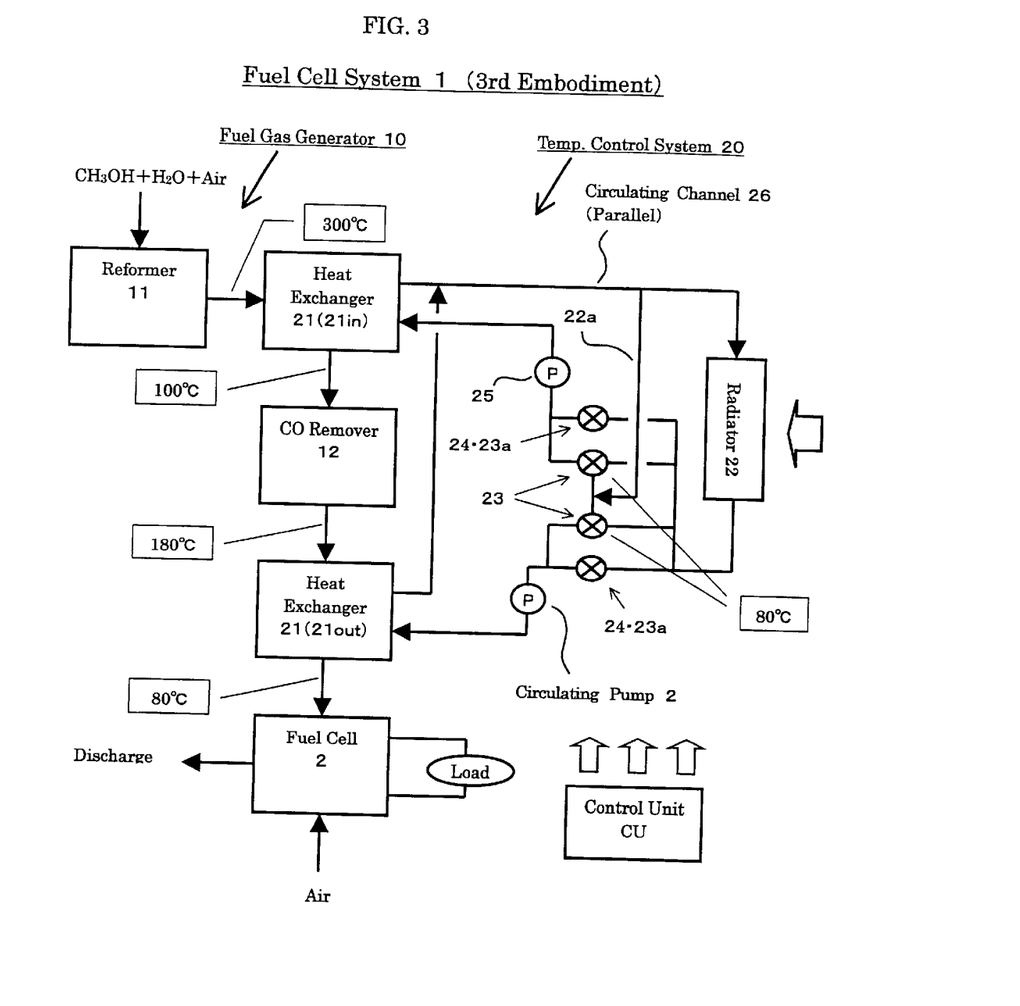
FIG. 3 is a block diagram of a fuel cell system according to the third embodiment of the present invention.

By referring to FIG. 3, a second embodiment of the present invention will be described. FIG. 3 is a block diagram of a fuel cell system according to the third embodiment of the present invention. The fuel cell system 1 shown in this figure is carried on a fuel cell electric vehicle (FCEV).

[Configuration]

The fuel cell system 1 according to the third embodiment has the same configuration as that of the first embodiment and that of the second embodiment, unless otherwise mentioned. Consequently, the parts and the elements overlapped with the first and the second embodiments have the same symbols and the repetition thereof will be omitted or described briefly.

As shown in FIG. 3, the fuel cell system 1 of the third embodiment is composed of the heat exchanger $21_{in}$ at the inlet side and the heat exchanger $21_{out}$ at the outlet side connected in parallel, each having the thermostat bypass control valve 24 and the thermostat bypass channel 23a, and the circulating pump 25.

The proportion of the flow amount of the coolant medium flowing forward the heat exchanger $21_{in}$ at the inlet side to that flowing forward the heat exchanger $21_{out}$ at the outlet side may be freely controlled by adjusting the blow amounts of the circulating pumps 25 and 25.

[Actuation]

Subsequently, an embodiment of actuation of the temperature control system 20 in the fuel cell system 1 described above will be described. In this embodiment, the thermostat bypass control valve 24 used herein is one which can freely control the opening of the valve similar to the first and the second embodiments.

1) Variation with Small Thermal Load;

As for variation with small thermal load, due to the function of controlling the temperature possessed by the thermostat 23 as in the first embodiment, the temperature of the fuel gas is controlled corresponding to the variation in thermal load in the heat exchanger 21. In the case where the thermal load is increased or vice versa, the thermostat 23 acts the same function as in the first embodiment.

As different from the second embodiment, since due to the thermostats 23 and 23 corresponding to the heat exchangers $21_{in}$ and $21_{out}$, the temperatures set by both thermostats 23 and 23 may be different from each other in this embodiment and, thus, the coolant media each having much more optimized temperature can be supplied to the heat exchangers $21_{in}$ and $21_{out}$.

2) Variation in Big Thermal Load:

As for the big thermal load, since the thermostat 23 cannot control the temperature in a quick manner as in the first embodiment, the temperature is controlled by the thermostat bypass control valve 24. In the case where the thermal load is increased or vice versa, the thermostat bypass control valve 24 acts the same function as in the first embodiment.

To be specific, when the thermal load is rapidly increased, the opening of the thermostat bypass control valve 24 is increased to bypass the thermostat 23 and to direct the coolant medium having a low temperature flowing from the radiator 22 towards downstream of the thermostat 23. This makes it possible to the temperature of the coolant medium flowing towards the heat exchangers ($21_{in}$ and $22_{out}$) lower than the set temperature. Accordingly, the temperature control system 20 of the second embodiment is applicable to a rapid increase in the thermal load at the heat exchanger 21, and can control the fuel gas at the outlet of the heat exchanger 21 in a precision manner.

On the other hand, even when the thermal load at the heat exchanger 21 which has been increased will be returned to the original state, the temperature of the coolant medium can be returned to the original state by decreasing the opening of the thermostat bypass control valve 24, whereby the variation in the thermal load can be applied to control the temperature of the fuel gas.

As described above, as in the first embodiment, the temperature control system according to the third embodiment of the present invention can quickly deal with the increase in the thermal load at the heat exchanger 21, which cannot be dealt (or followed up) by the thermostat 23 and, thus, the temperature of the fuel gas can be controlled in a precision manner in all cases.

Also, in addition to the parallel connection of the circulating channels 26, by placing the thermostat 23, the thermostat bypass control valve 24, and the like in each channel, the coolant media having different temperatures can be supplied to the heat exchangers $21_{in}$ and $21_{out}$, respectively, which further increases the precision of controlling the temperature of the fuel gas.

Control Flow of Control Unit

Figure 4:
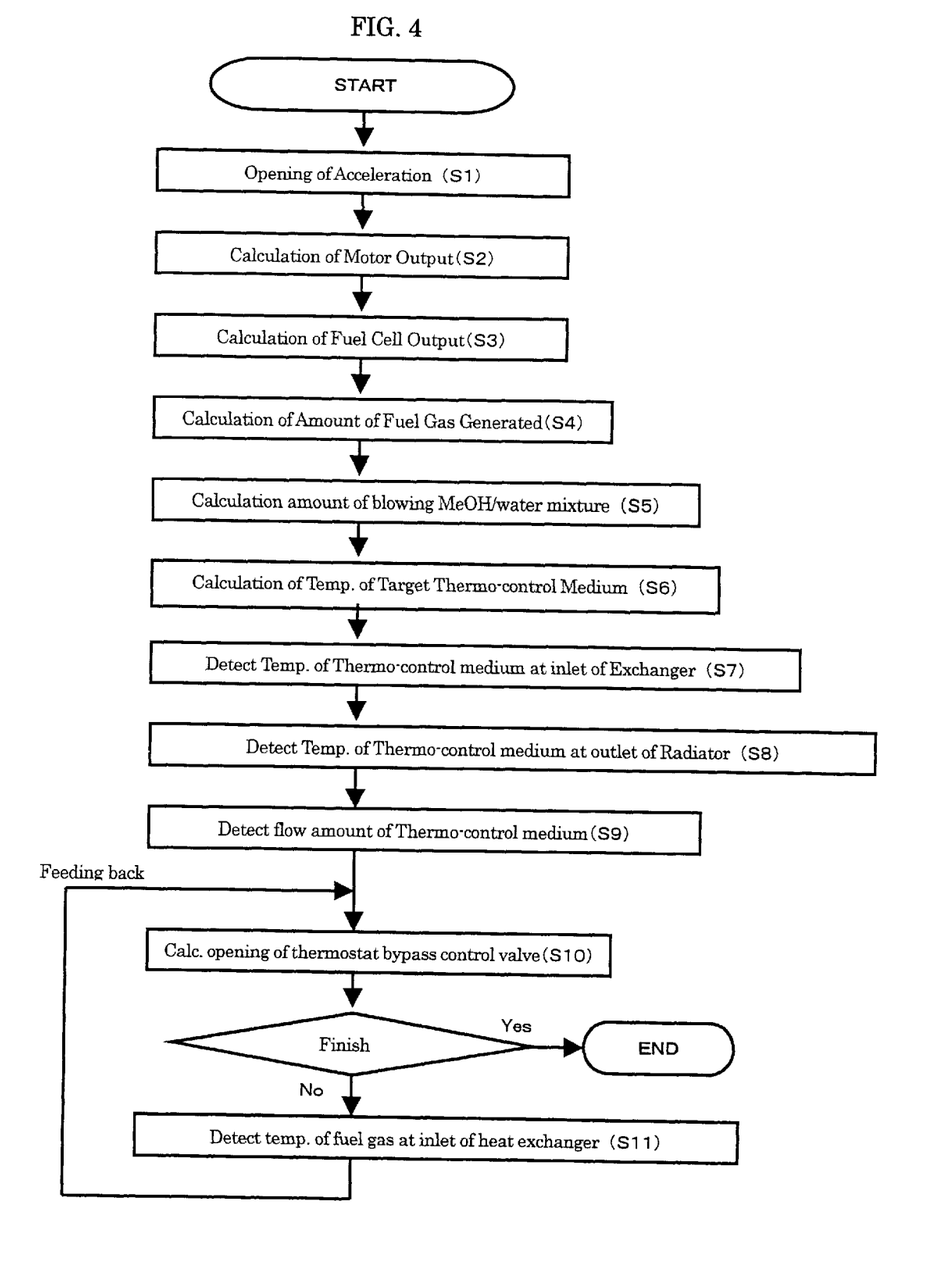
FIG. 4 is a drawing showing the control flow of the temperature control system.

Next, one embodiment of controlling the thermostat bypass control valve 24 by the control unit CU will be described by referring to the flow chart shown in FIG. 4. The fuel cell system 1 is carried on the automobile.

When a driver pushes the accelerator, the opening of the accelerator is increased (S1), and the output of the motor is calculated on the basis of the opening of the accelerator (S2). Subsequently, the output of the fuel cell is calculated (S3), the amount of the fuel gas generated by the reformer 2 is calculated (S4), the blowing amount of the water/methanol mixture is calculated (S5), and then the target temperature of the coolant medium is calculated (S6). Subsequently, the temperature of the coolant medium at the inlet of the heat exchanger 21 (S7), the temperature of the coolant medium at the outlet of the heat exchanger 21 is detected (S8), and the flow amount of the coolant medium at the outlet of the heat exchanger 21 is detected (S9). Furthermore, on the basis of these calculated values and detected values, the opening of the thermostat bypass control valve 24 is calculated by the control unit CU (S10), and the opening is adjusted. The control unit CU detects the temperature of the fuel gas at the inlet of the heat exchanger (S11). While the detected temperature is fed back to the control unit CU, the opening of the thermostat bypass control valve 24 is calculated (S10) to control the opening of the thermostat bypass control valve 24.

While the invention has been described in detail with reference to the specific embodiments thereof, it will be apparent to one skilled in the art that various changes and modifications can be made without departing from the spirit and scope thereof.

What is claimed is:

1. A temperature control system for controlling a fuel gas of fuel cell, which system comprising a fuel reformer for reforming a hydrocarbon fuel into a reformed gas mainly comprising hydrogen, a carbon monoxide remover for removing carbon monoxide in the reforming gas and said reformed fuel gas is supplied to said fuel cell, said temperature control system comprising:

at least one heat exchanger which exchanges heat between the fuel gas and a coolant medium, said heat exchanger being placed at an inlet side and/or outlet side of said carbon monoxide remover, a radiator which radiates the heat exchanged by said heat exchanger, a thermostat which is connected to said radiator and a radiator bypass channel which bypasses said radiator, said thermostat being actuated by said coolant medium at a predetermined temperature, so as to decrease the flow of the coolant medium from the radiator when the temperature of the coolant medium is lower than said predetermined value, and increase the flow of the coolant medium from the radiator when the temperature of the coolant medium is higher than said predetermined value, a thermostat bypass control valve connected to said radiator and said heat exchanger, a control unit which detects the temperature of said fuel gas, and controls said thermostat bypass control valve based on said detected temperature, so as to open said thermostat bypass control valve when said detected temperature is higher than a second predetermined temperature and to close said thermostat bypass control valve when said detected temperature is lower than said second predetermined temperature.

2. The temperature control system as claimed in claim 1, wherein said temperature control system has the heat exchangers at the inlet and the outlet sides of the carbon monoxide remover and, said circulating channel connects the heat exchangers in series, so as to circulate the coolant medium from said heat exchanger placed at the outlet of the carbon monoxide remover to the heat exchanger placed at the inlet of the carbon monoxide remover.

3. The temperature control system as claimed in claim 1, wherein said temperature control system has the heat exchangers at the inlet and the outlet sides of the carbon monoxide remover and, a circulating pump connects the heat exchangers in parallel.

4. The temperature control system as claimed in claim 3, wherein each heat exchanger has the thermostat, the thermostat bypass valve, and a circulating channel.

* * * * *